United States Patent
Salvekar et al.

(10) Patent No.: US 8,923,171 B2
(45) Date of Patent: Dec. 30, 2014

(54) APPARATUS AND METHOD FOR REDUCING UE'S POWER CONSUMPTION BY CONTROLLING EARLY DECODING BOUNDARY

(71) Applicant: QUALCOMM Incorporated, San Diego, CA (US)

(72) Inventors: Atul Arvind Salvekar, Emeryville, CA (US); Sharad Deepak Sambhwani, San Diego, CA (US); Prashant Udupa Sripathi, Santa Clara, CA (US); Nate Chizgi, Sunnyvale, CA (US); Christopher Cooper Riddle, San Diego, CA (US); An-Swol Clement Hu, Belmont, CA (US); Harish Venkatachari, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 13/752,939

(22) Filed: Jan. 29, 2013

(65) Prior Publication Data

US 2014/0078946 A1 Mar. 20, 2014

Related U.S. Application Data

(60) Provisional application No. 61/703,480, filed on Sep. 20, 2012.

(51) Int. Cl.
*H04B 1/44* (2006.01)
*H04B 1/66* (2006.01)
*H04W 52/02* (2009.01)

(52) U.S. Cl.
CPC ...... *H04W 52/0229* (2013.01); *H04W 52/0245* (2013.01); *Y02B 60/50* (2013.01)
USPC .......... 370/282; 370/278; 370/311; 375/341; 375/346; 375/348

(58) Field of Classification Search
USPC .......... 370/278, 282, 311, 318, 328; 375/317, 375/340, 341, 346, 348
See application file for complete search history.

(56) References Cited

U.S. PATENT DOCUMENTS

| 5,265,270 A | 11/1993 | Stengel et al. |
| 5,406,613 A | 4/1995 | Peponides et al. |

(Continued)

FOREIGN PATENT DOCUMENTS

DE 19813507 A1 9/1999

OTHER PUBLICATIONS

Ma Z., et al., "A Joint early detection-early stopping scheme for short-frame turbo decoding", International Journal of Electronics and Communications, 2011, pp. 37-43, vol. 65.

(Continued)

*Primary Examiner* — Benjamin H Elliott, IV
(74) *Attorney, Agent, or Firm* — Charles E. Eggers

(57) ABSTRACT

Disclosed are methods and apparatus for reducing UE's power consumption by controlling early decoding boundary. In one aspect, a UE is configured to receive a data or voice frame from a base station. The UE selects one or more quality metrics for determining decoding boundary of the received frame and computes the selected one or more quality metrics. The UE then determines a decoding boundary for the frame based on one or more computed quality metrics. The UE then decodes the received frames at the determined decoding boundary and determines whether the decoding of the frame was successful. If the early decoding of the frame was successful, the UE may terminate reception of the frame. If the early decoding of the frame was unsuccessful, the UE may adjust the decoding boundary and decodes the frame at the adjusted boundary.

28 Claims, 8 Drawing Sheets

(56) References Cited

U.S. PATENT DOCUMENTS

| | | |
|---|---|---|
| 7,051,268 B1 | 5/2006 | Sindhushayana et al. |
| 8,214,728 B2 | 7/2012 | Lundby |
| 8,223,869 B2 | 7/2012 | Bottero et al. |
| 8,413,028 B2 * | 4/2013 | Papageorgiou ............... 714/786 |
| 2006/0142038 A1 * | 6/2006 | Ozarow et al. ............... 455/522 |
| 2009/0304024 A1 | 12/2009 | Jou et al. |
| 2014/0078946 A1 * | 3/2014 | Salvekar et al. ............. 370/311 |

OTHER PUBLICATIONS

International Search Report and Written Opinion—PCT/US2013/060643—ISA/EPO—Jan. 14, 2014.

* cited by examiner

APPARATUS AND METHOD FOR REDUCING UE'S POWER CONSUMPTION BY CONTROLLING EARLY DECODING BOUNDARY

CLAIM OF PRIORITY UNDER 35 U.S.C. §119

The present application for patent claims priority to Provisional Application No. 61/703,480 entitled "Apparatus and Method for Reducing UE's Power Consumption by Controlling Early Decoding boundary" filed on Sep. 20, 2012, and assigned to the assignee hereof and hereby expressly incorporated by reference herein.

BACKGROUND

1. Field

Aspects of the present disclosure relate generally to wireless communication systems, and more particularly, to an apparatus and method for reducing UE's power consumption by controlling early decoding boundary.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (WCDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. High Speed Downlink Packet Access (HSDPA) is a data service offered on the downlink of WCDMA networks.

Some WCDMA systems provide early voice frame termination functionality by which early decoding on voice transport channels is attempted by the UE receiver, so that the receiver may be transitioned into a low-power state to preserver batter power if the early decoding of the voice frame is deemed successful. Therefore, it is possible to reduce receiver's power consumption by controlling early decoding boundary.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Disclosed are methods and apparatus for reducing UE's power consumption by controlling early decoding boundary. In one aspect, a UE is configured to receive a data or voice frame from a base station. The UE selects one or more quality metrics for determining decoding boundary of the received frame and computes the selected one or more quality metrics. The UE then determines a decoding boundary for the frame based on one or more computed quality metrics. The UE then decodes the received frames at the determined decoding boundary and determines whether the decoding of the frame was successful. If the early decoding of the frame was successful, the UE may terminate reception of the frame. If the early decoding of the frame was unsuccessful, the UE may adjust the decoding boundary and decodes the frame at the adjusted boundary.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
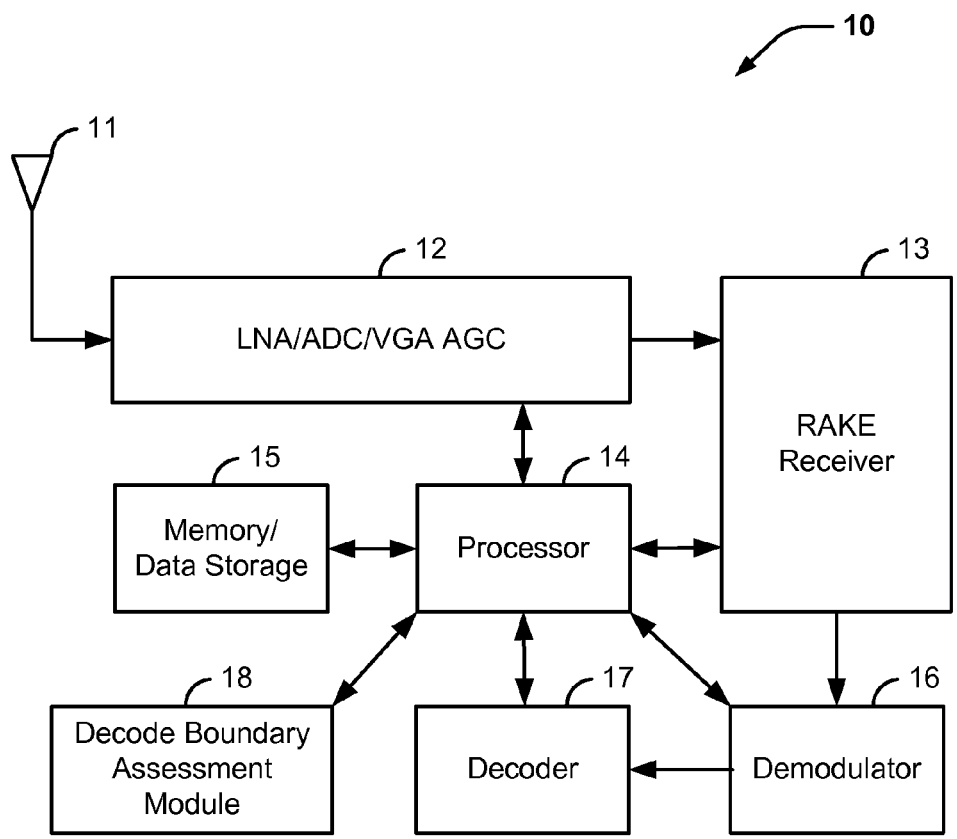
FIG. 1 is a block diagram that illustrates one example implementation of a user equipment.

FIG. 1 illustrates an example configuration of a user equipment (UE) 10. UE 10 includes a RF antenna 11 that receives RF signals, such as WCDMA voice or data packets and pilot signals, from a base station and transforms them into electromagnetic signals. The signals are transmitted to amplifier circuit 12, which may include a low noise amplifier (LNA), analog-to-digital converter (ADC), variable gain amplifier (VGA) and automatic gain control (AGC) circuit, which calibrates operating range of the LNA, ADC and VGA. The amplified and digitized signals are then passed to a Rake receiver 13, which is designed to mitigate the effects of multipath fading. Rake receiver 13 may include a path search for identifying different propagation paths of the signal, a channel estimator that estimate channel conditions, such as time delay, amplitude and phase for each path component, and a path combiner that combines strongest multipath components of the received signal into one signal. The resulting signal is then demodulated by a demodulator 16, such as a QPSK demodulator, equalizer, or multi-user/code detector. The demodulated signal is passed to decoder 17, such as Viterbi decoder, which performs decoding of the convolutionally encoded data used in WCDMA transmissions. In one aspect, the Rake receiver 13, demodulator 16 and decoder 17 may be implemented using a Digital Signal Processor (DSP). The UE 10 also includes a processor 14, such as a microprocessor, microcontroller, or CPU, which executes programs for controlling operation of the components of the UE, and memory 15 that stores data and programs executed by the processor 14.

Figure 2:
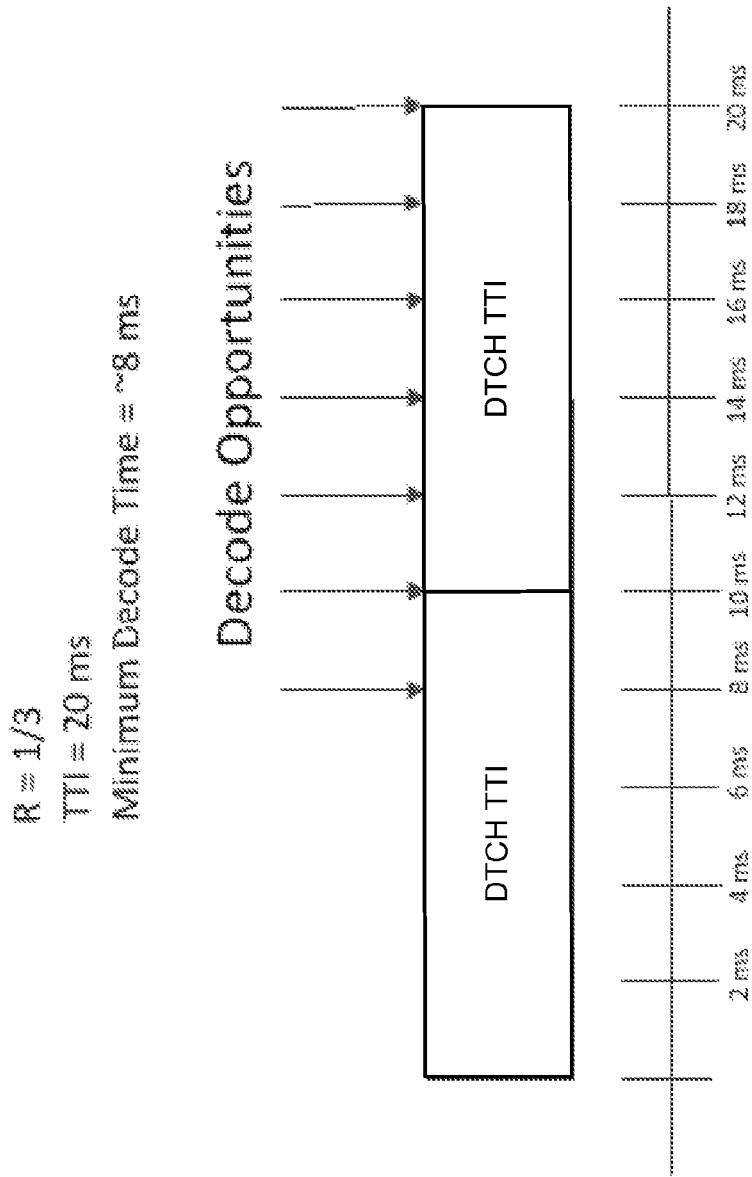
FIG. 2 is a block diagram that illustrates a DTCH frame structure showing various decoding boundaries.

As mentioned above, some WCDMA systems provide early voice frame termination functionality that allows UE 10 to perform early decoding of data on voice and data transport channels, so that the receiver circuitry of UE 10 may be transitioned into a low-power state to preserver UE's batter power if the early decode of the received data or voice frames is deemed successful. This is illustrated in FIG. 2. The base station divides voice or data into blocks, which are encoded and transmitted to the UE 10 on a Downlink (DL) Dedicated Traffic Channel (DTCH) as one or more frames. Each DTCH frame has duration of transmission time interval (TTI), which may span one, two, four, or eight 10 ms slots. A depicted, the UE 10 can attempt to decode the DTCH frames as early as at 8 ms into the TTI. This decode time is known as a decoding boundary. If the DTCH frame has been successfully decoded, the UE 10 may power down its receiver circuitry to conserve battery. However, if an early decode of the DTCH frame has failed, UE 10 can attempt to decode the DTCH at a later decoding boundary, e.g., 10 ms, 12 ms or 14 ms boundary, which will require UE 10 to operate in high power mode for a longer time and therefore consumer more battery power.

Therefore, it is desirable to dynamically control DTCH decoding boundary in order to prevent unnecessary early decodes and optimize UE's power consumption. To that end, in one implementation, the UE 10 includes a decoding boundary assessment module 18 that determines proper decoding boundary for DTCH frames based on various transmission quality metrics (M), including, but not limited to: decoder quality metric, Signal-to-Interference Ratio (SIR) metric, Symbol Error Rate (SER) metric, encoding rate metric, and other types of metrics, such as computation and power metrics.

Figure 3:
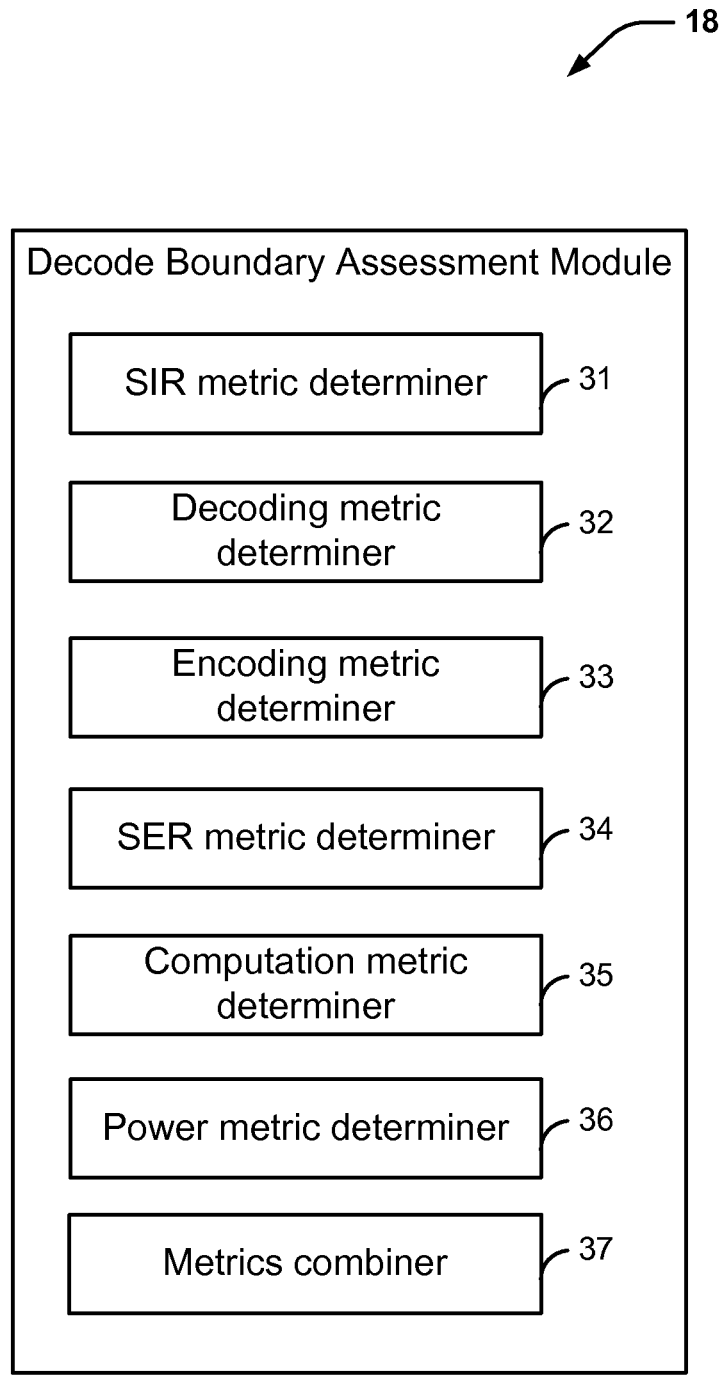
FIG. 3 is a block diagram that illustrates one example implementation of an early decode assessment module.

FIG. 3 shows one example implementation of the decoding boundary assessment module 18. The module 18 may include the following sub-modules: SIR metric determiner 31, decoding metric determiner 32, encoding metric determiner 33, SER metric determiner 34, computation metric determiner 35, power metric determiner 36 and metric combiner 37. In one aspect, the SIR metric determiner 31 estimates signal-to-interference ratio (SIRE) from a common and/or dedicated pilot channels. For instance, signal power may be estimated based on the common pilot. And, the noise-and-interference power may be determined as a difference between two successive pilots. The SIR metric determiner 31 may compare the SIRE with SIR Target (SIRT) to determine whether to perform early decode of the DTCH frames. For example, if SIRE−SIRT>3 dB, decode at 8 ms boundary, else start decodes at 10 ms boundary.

In another aspect, the decoding metric determiner 32 may use Viterbi decoder path metrics, such as best and second best paths on the trellis diagram, to determine quality of the received signals and the appropriate decoding boundary for the DTCH frames. For example, if a 10 ms decode of DTCH frame was in error, the receiver may try only 14 ms decodes for all subsequent DTCH frames until signal quality improves, as determined by the decoding metric determiner 32. Particularly, determiner 32 may identify when the first best path on the Trellis diagram significantly better then the second best path, which indicates improvement in received signal quality. When this takes place, the receiver may switch back to early, e.g., 10 ms, decodes and powering down the receiver if early decode is successful. Alternatively, if decoding metric determiner 32 determines that on the last decode best path metric (at 10 ms) minus second best path (at 10 ms) less than a Threshold, then switch back to 14 ms decodes.

In another aspect, the encoding metric determiner 33 may use information about the type of encoding combined with SIRE measurement to select the appropriate decoding boundary for the DTCH frames. Particularly, full-rate voice encoding typically requires high SIR while silence descriptor (SID) transmissions and Null transmissions require a much lower SIR for decoding. Therefore, if a full-rate encoded transmission is detected and SIRE−SIRT<0 dB, then decode full-rate transmission at 14 ms only. However, in case of SID or Null transmissions, early decode, e.g., at 10 ms, may be performed if SIRE−SIRT<0 dB.

In another aspect, the SER metric determiner 34 may use symbol error rate (SER) to determine the appropriate decoding boundary for the DTCH frames. SER indicates the difference between the best path in the decoder trellis and the hard decoded bits. Typically, high SER is an indicator of a poor quality radio channel between a base station and a UE. Even in case of correct early decoding of a DTCH frame, the SER may be high, which indicates that successful early decode was an anomaly and the DTCH frames should be decoded at a later decoding boundary, e.g., 14 ms. Thus, for example, the SER metric determiner 34 may determine if at 10 ms decode, the SER>Threshold, then attempt only 14 ms decode on the current and subsequent DTCH frames.

In another aspect, the computation metric determiner 35 may determine what additional computing resources (e.g., processing time) that may be consumed by one or more of the amplifier circuit 12, Rake receiver 13, processor 14, demodulator 16, decoder 17 and/or other components of UE 10 to perform additional (early or late) decodes of DTCH frames that impact other operations of the UE 10. For example, if computation metric determiner 35 determines that the raw DSP computations are nearing the peak limit at a given low power setting, than determiner 35 may limit the number of early decode attempts to prevent need to increase the clock speed or voltage level of the DSP. In another example, if the UE is in a scenario where there are a large number of blocks requiring early decode attempt vs. a small number of blocks, then determiner 35 may again limit the number of early decode attempts.

Yet in another aspect, the power metric determiner 36 may estimate additional battery power that may be consumed by one or more of the amplifier circuit 12, Rake receiver 13, processor 14, demodulator 16, decoder 17 and/or other components of UE 10 to perform additional (early or late) decodes of DTCH frames that impact other operations of the UE 10. For example, if the power metric determiner 26 determines that the power cost of an early decode attempt is very small, then determiner 26 may implement an algorithm which allows a larger number of early decode attempts.

Yet in another aspect, the metric combiner 37 may combine, using a combining function (F), multiple quality metrics (M) provided by the one or more of the SIR metric determiner 31, decoding metric determiner 32, encoding metric determiner 33, SER metric determiner 34, computation metric determiner 35 and/or power metric determiner 36 to determine the appropriate decoding boundary (TDecode) for the DTCH frame that will prevent unnecessary (erroneous) early decodes and optimize power consumption of UE 10. The decoding boundary function may be represented as follows: $T_{Decode}=F(M_1, M_2, M_3, \ldots, M_N)$. For example, a simple decoding boundary function may look like: $T_{Decode}=$ (SIRE>SIRT+3 dB). This decode boundary function F chooses the decode boundary ($T_{Decode}$) to be a function of the excess SIRE over the SIRT and mute vs. voice traffic. For example, if SIRE is more than 3 dB above SIRT and UE 10 is not currently receiving any voice traffic, then decoding boundary function F may try to perform more earlier decode attempts, e.g., at 8 ms and 10 ms. However if UE 10 is receiving voice traffic or SIRE is not much more than SIRT, then decoding boundary function F may not try to decode at 8 ms and wait for a later time for the first decode attempt. This is an example of how the decode boundary T could be a function of different quality metrics (SIRE, SIRT and MUTE/Voice traffic). The function F may be optimized offline in a simulation environment or may be adaptively tuned over time based on actual decode success/failure measurements in diverse channel environments.

Figure 4:
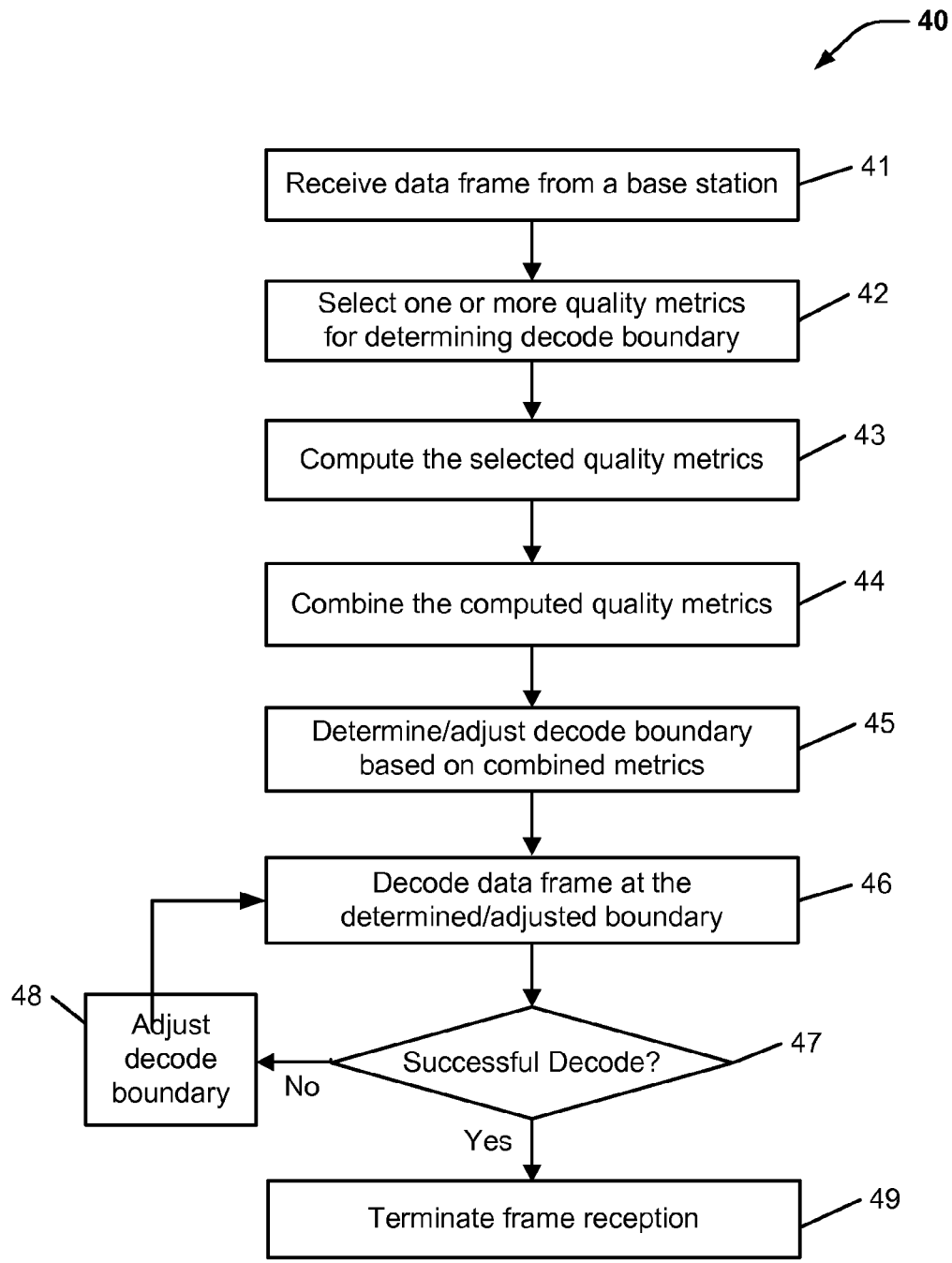
FIG. 4 is a flow chart that illustrates an example method for determining frame decoding boundary.

FIG. 4 is an example method 40 for determining decoding boundary for DTCH frames. For example, in an aspect, methodology 40 may be executed by UE and/or components thereof, such as UE 10 (FIG. 1), one or more receiver components, and power control module 18 (FIGS. 1 and 3). At step 41, the method 40 includes a UE receiving a DTCH data or voice frame from a base station. For example, referring to FIG. 1, a UE may use RF antenna 11, power amplifier 12, Rake receiver 13 and demodulator 16 to receive and demodulate signals from a base station. At step 42, the method 40 selects one or more quality metrics (M) for determining decoding boundary for the frame. For example, referring to FIGS. 1 and 3, a UE may use decoding boundary assessment module 18 to select one or more quality metrics. At step 43, the method 40 computes one or more selected quality metrics. For example, referring to FIGS. 1 and 3, a UE may compute quality metrics using one or more of the metric determiners 31-36. If several metrics are computed, at step, 44 the method 40 combines the computed quality metrics using a combining functions. For example, referring to FIGS. 1 and 3, a UE may use metric combiner 37 to combine several quality metrics. At step 45, the method 40 determines or adjusts frame decoding boundary based on the combined metric. For example, referring to FIGS. 1 and 3, a UE may use decoding boundary assessment module 18 to adjust frame decoding boundary. At step 46, the method 40 decodes DTCH frame at the determined/adjusted boundary. For example, referring to FIGS. 1 and 3, a UE may use decoder 17 to decode frame at the specified boundary. If it is determined at step 47 that the frame has been decoded successfully, the method 40 terminates frame reception at step 49. If it is determined at step 47 that the frame was not decoded successfully, the method 40 adjusts (e.g. increases), the decoding boundary at step 48, and repeats the attempt frame decode at the new boundary at step 46. For example, referring to FIGS. 1 and 3, a UE may use decoding boundary assessment module 18 to adjust frame decoding boundary.

Figure 5:
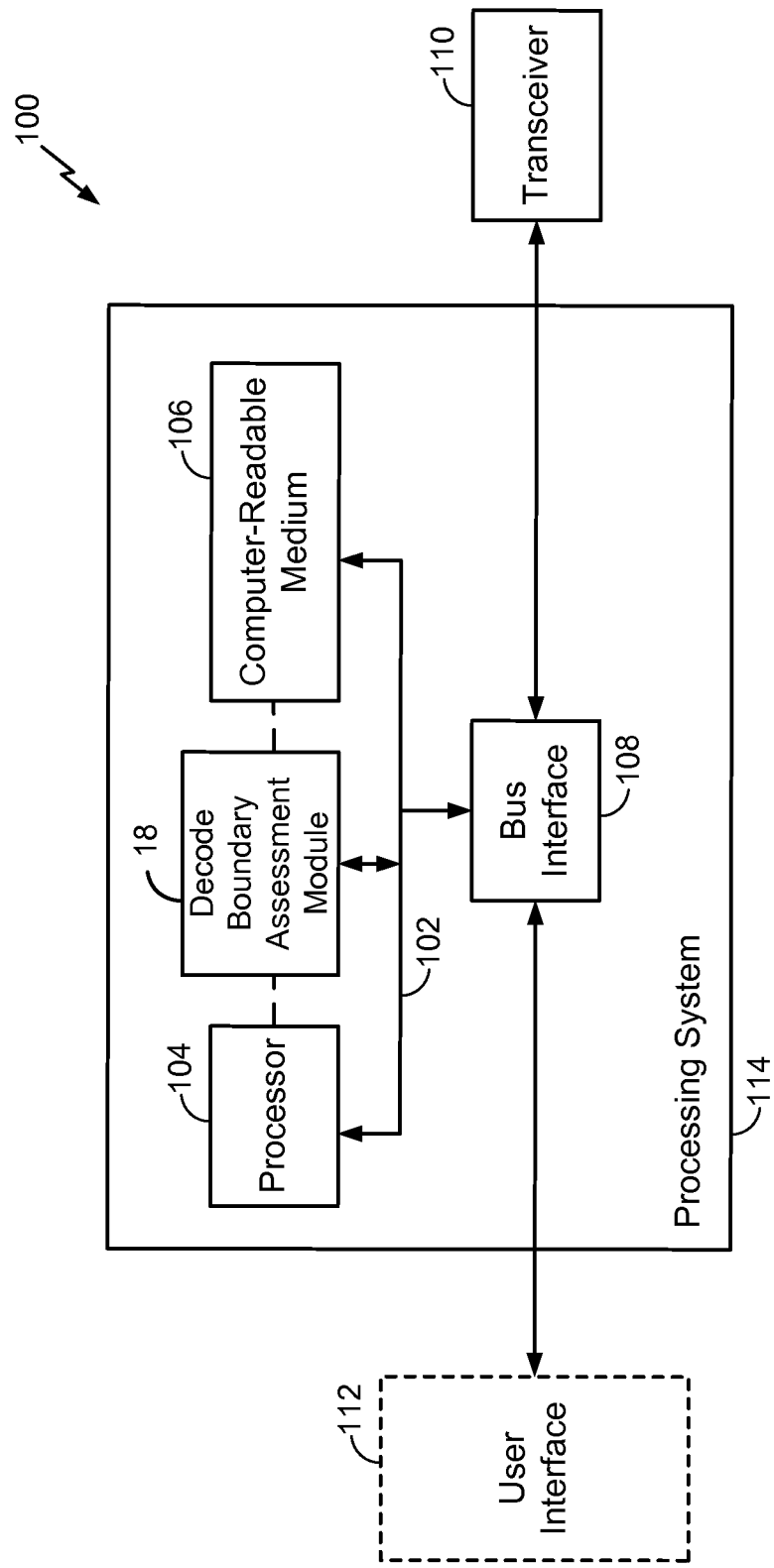
FIG. 5 is a block diagram illustrating an example of a hardware implementation for an apparatus employing a processing system configured determine frame decoding boundary.

FIG. 5 is a block diagram illustrating an example of a hardware implementation for an apparatus 100, such as a UE, employing a processing system 114. Apparatus 100, which may be UE 10 (FIG. 1), employing a processor system 114 that executes the apparatus and methods described herein, including the functionality of decoding boundary assessment module 18 (FIGS. 1 and 3). In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 6:
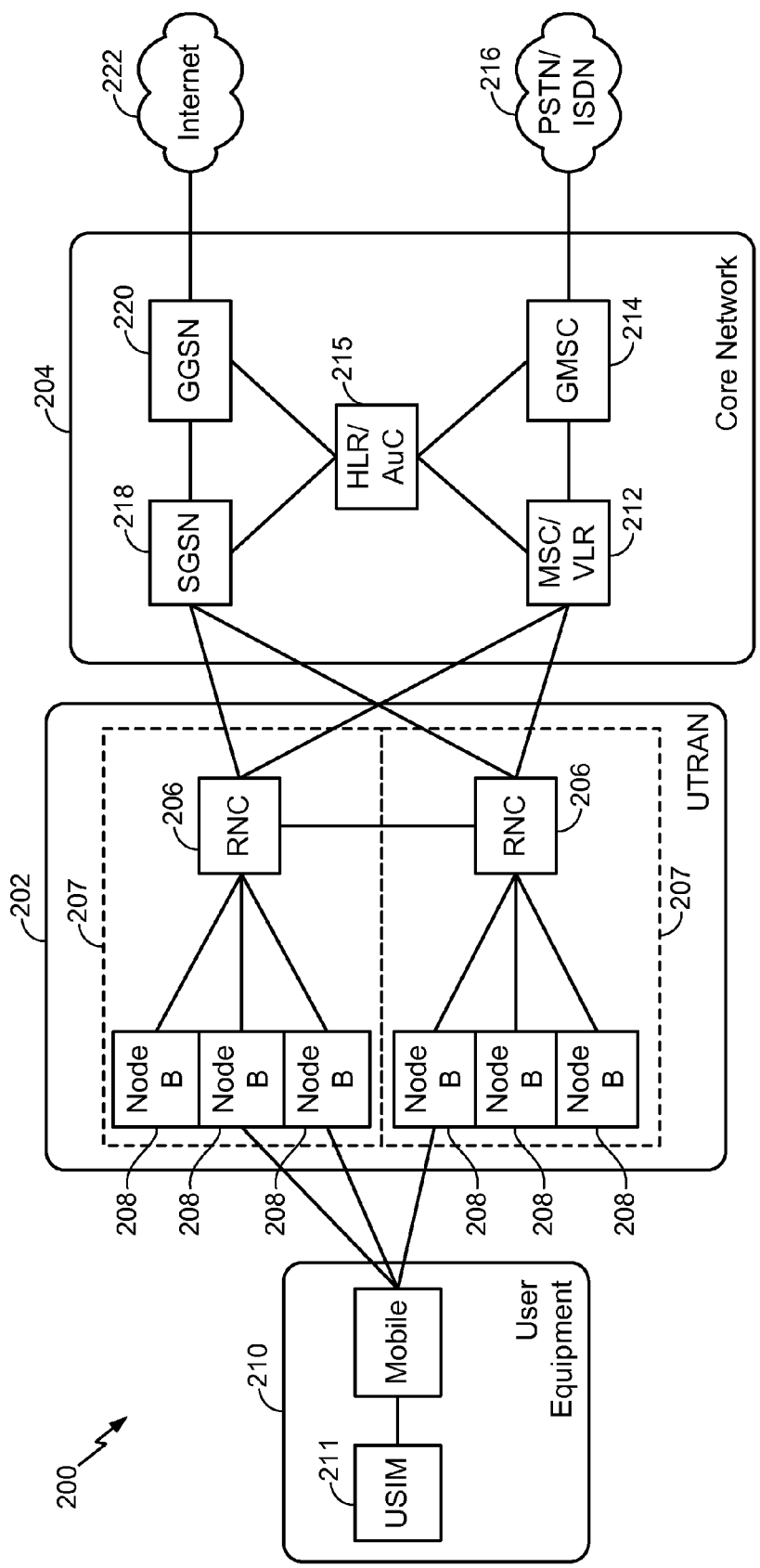
FIG. 6 is a block diagram conceptually illustrating an example of a telecommunications system including an aspect of the user equipment configured to determine frame decoding boundary.

The various concepts presented throughout this disclosure may be implemented across a broad variety of telecommunication systems, network architectures, and communication standards. By way of example and without limitation, the aspects of the present disclosure may be implemented by the UE illustrated in FIG. 6, which is presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210, which may be similar to UE 10 (FIG. 1) and including decoding boundary assessment module 18 (FIGS. 1 and 3), and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 7:
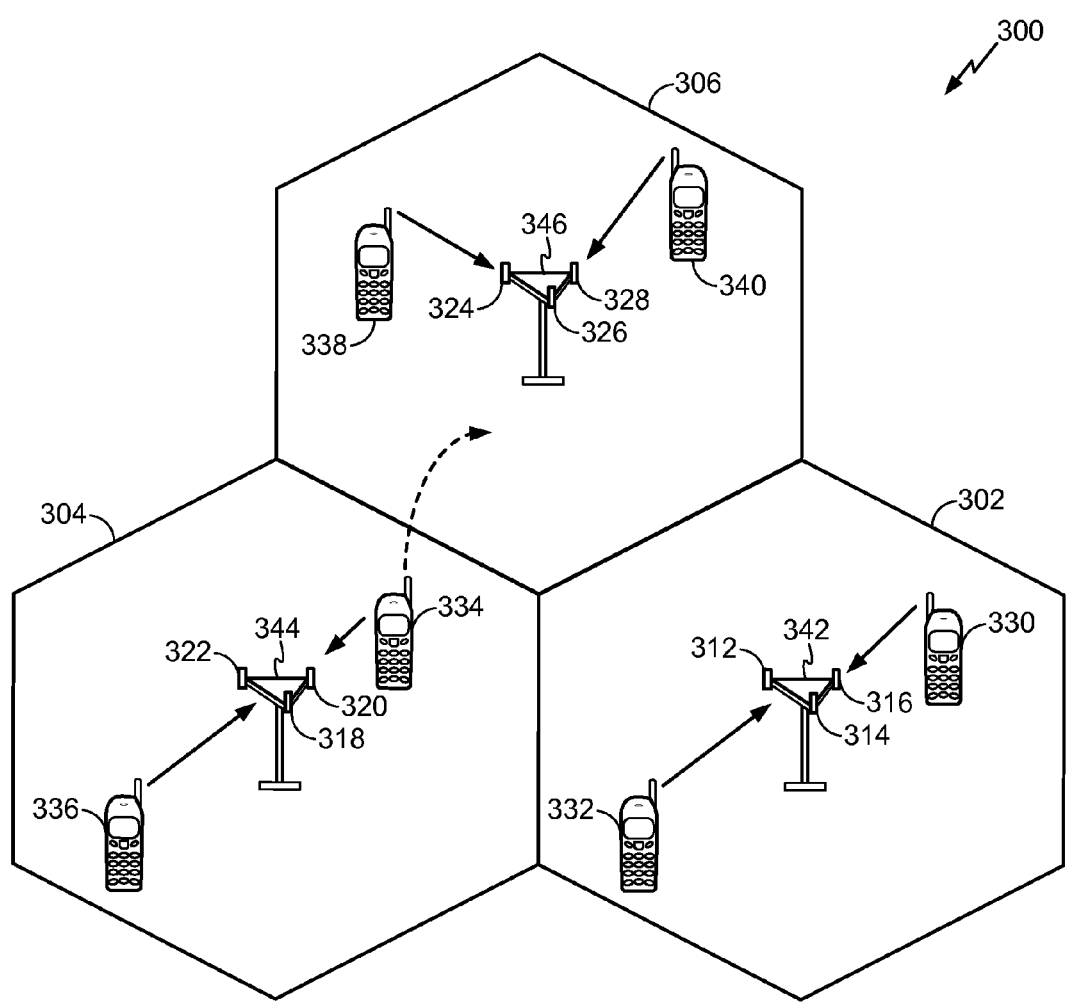
FIG. 7 is a conceptual diagram illustrating an example of an access network including a user equipment configured to determine frame decoding boundary.

Referring to FIG. 7, an access network 300 in a UTRAN architecture is illustrated, including one or more UEs configured with the present apparatus or methods. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 5) for all the UEs 330, 332, 334, 336, 338, 340 in the respective cells 302, 304, and 306. Further, one or more of UEs 330, 332, 334, 336, 338, 340 may be the same as or similar to UE 10 (FIG. 1), including decoding boundary assessment module 18 (FIGS. 1 and 2).

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 5), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 8:
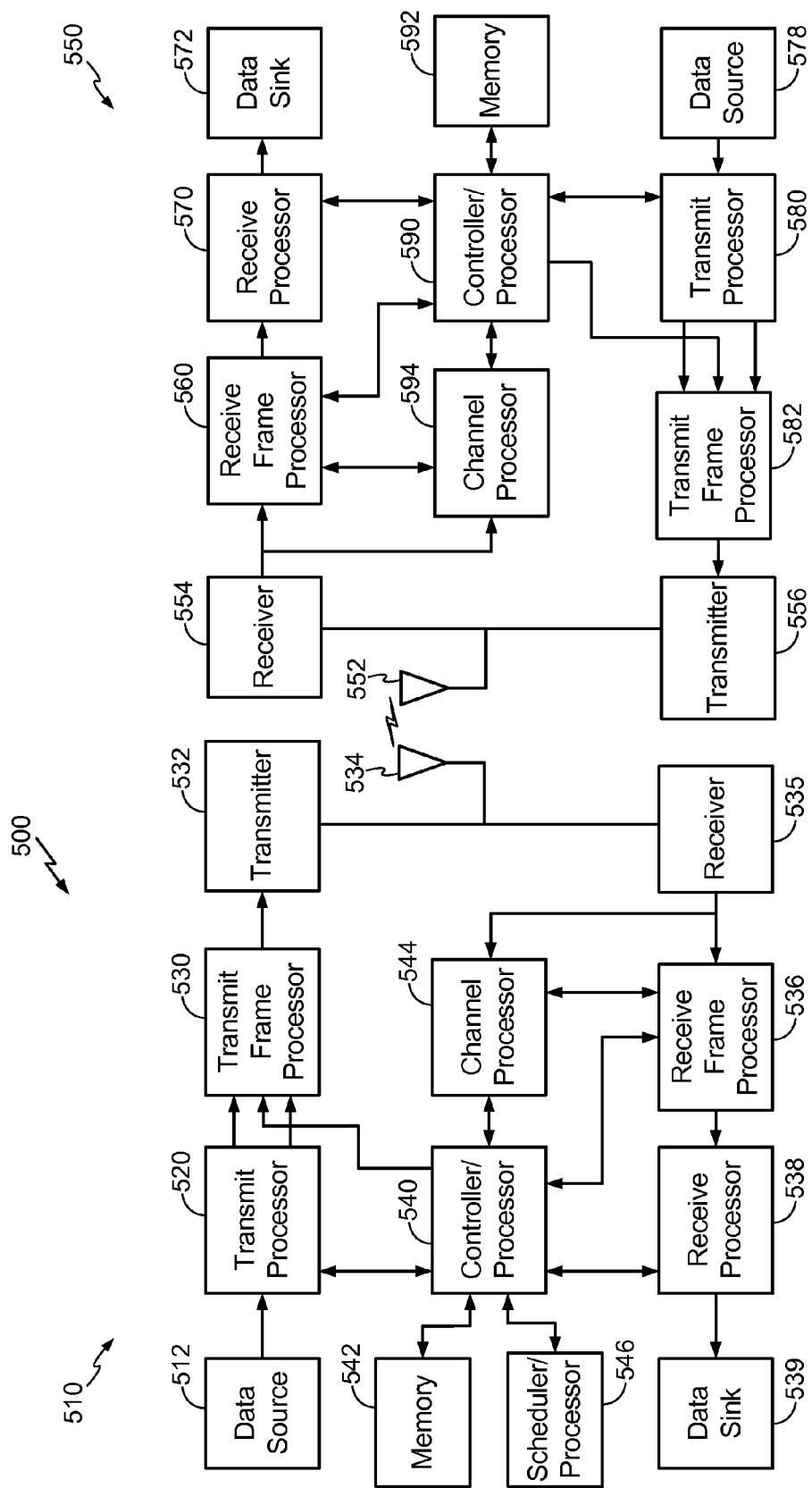
FIG. 8 is a block diagram conceptually illustrating an example of a Node B in communication with a UE in a telecommunications system, wherein the user equipment is configured to determine frame decoding boundary.

FIG. 8 is a block diagram of a Node B 510 in communication with a UE 550, where the Node B 510 may be the Node B 208 in FIG. 5, and the UE 550 may be the UE 10 in FIG. 1, executing decoding boundary assessment module 18 (FIGS. 1 and 3). In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phaseshift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, such as a custom application-specific integrated circuit (ASIC), and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communication, comprising:
   receiving, by a processor of a user equipment (UE), a data or voice frame from a base station;
   selecting one or more quality metrics for determining a decoding boundary of the received frame;
   computing the selected one or more quality metrics;
   determining the decoding boundary for the received frame based on the one or more computed quality metrics;
   decoding the received frame at the determined decoding boundary;
   determining whether the decoding of the received frame was successful;
   when the decoding was successful, terminating reception of the rest of the received frame; and
   when the decoding was unsuccessful, adjusting the decoding boundary and decoding the received frame at the adjusted decoding boundary.

2. The method of claim 1, wherein the received frame is received using a Wideband-Code Division Multiple Access (WCDMA) radio access technology.

3. The method of claim 1, wherein decoding includes Viterbi decoding.

4. The method of claim 1, wherein the one or more quality metrics are based on a signal-to-interference ratio (SIR).

5. The method of claim 1, wherein the one or more quality metrics are based on a symbol error rate (SER).

6. The method of claim 1, wherein the one or more quality metrics are based on Viterbi decoder paths.

7. The method of claim 1, wherein the one or more quality metrics are based on a rate of encoding.

8. An apparatus for wireless communication, comprising:
   at least one processor configured to:
     receive a data or voice frame from a base station;
     select one or more quality metrics for determining a decoding boundary of the received frame;
     compute the selected one or more quality metrics;
     determine the decoding boundary for the received frame based on the one or more computed quality metrics;
     decode the received frame at the determined decoding boundary;
     determine whether the decoding of the received frame was successful;
     when the decoding was successful, terminate reception of the rest of the received frame; and
     when the decoding was unsuccessful, adjust the decoding boundary and decode the received frame at the adjusted decoding boundary.

9. The apparatus of claim 8, wherein the received frame is received using a Wideband-Code Division Multiple Access (WCDMA) radio access technology.

10. The apparatus of claim 8, wherein decoding includes Viterbi decoding.

11. The apparatus of claim 8, wherein the one or more quality metrics are based on a signal-to-interference ratio (SIR).

12. The apparatus of claim 8, wherein the one or more quality metrics are based on a symbol error rate (SER).

13. The apparatus of claim 8, wherein the one or more quality metrics are based on Viterbi decoder paths.

14. The apparatus of claim 8, wherein the one or more quality metrics are based on a rate of encoding.

15. An apparatus for wireless communication, comprising:
means for receiving a data or voice frame from a base station;
means for selecting one or more quality metrics for determining a decoding boundary of the received frame;
means for computing the selected one or more quality metrics;
means for determining the decoding boundary for the received frame based on the one or more computed quality metrics;
means for decoding the received frame at the determined decoding boundary;
means for determining whether the decoding of the received frame was successful;
means for, when the decoding was successful, terminating reception of the rest of the received frame; and
means for, when the decoding was unsuccessful, adjusting the decoding boundary and decoding the received frame at the adjusted decoding boundary.

16. The apparatus of claim 15, wherein the received frame is received using a Wideband-Code Division Multiple Access (WCDMA) radio access technology.

17. The apparatus of claim 15, wherein decoding includes Viterbi decoding.

18. The apparatus of claim 15, wherein the one or more quality metrics are based on a signal-to-interference ratio (SIR).

19. The apparatus of claim 15, wherein the one or more quality metrics are based on a symbol error rate (SER).

20. The apparatus of claim 15, wherein the one or more quality metrics are based on Viterbi decoder paths.

21. The apparatus of claim 15, wherein the one or more quality metrics are based on a rate of encoding.

22. A computer program product, comprising:
a non-transitory computer-readable medium comprising code for:
receiving a data or voice frame from a base station;
selecting one or more quality metrics for determining a decoding boundary of the received frame;
computing the selected one or more quality metrics;
determining the decoding boundary for the received frame based on the one or more computed quality metrics;
decoding the received frame at the determined decoding boundary;
determining whether the decoding of the received frame was successful;
when the decoding was successful, terminating reception of the rest of the received frame; and
when the decoding was unsuccessful, adjusting the decoding boundary and decoding the received frame at the adjusted decoding boundary.

23. The product of claim 22, wherein the received frame is received using a Wideband-Code Division Multiple Access (WCDMA) radio access technology.

24. The product of claim 22, wherein decoding includes Viterbi decoding.

25. The product of claim 22, wherein the one or more quality metrics are based on a signal-to-interference ratio (SIR).

26. The product of claim 22, wherein the one or more quality metrics are based on a symbol error rate (SER).

27. The product of claim 22, wherein the one or more quality metrics are based on Viterbi decoder paths.

28. The product of claim 22, wherein the one or more quality metrics are based on a rate of encoding.

* * * * *